July 15, 1958 G. E. DRIVER 2,843,815
TRANSISTOR HIGH VOLTAGE POWER SUPPLY
Filed Jan. 20, 1955

INVENTOR.
GARTH E. DRIVER
BY
Roland G. Anderson
ATTORNEY

United States Patent Office 2,843,815
Patented July 15, 1958

2,843,815

TRANSISTOR HIGH VOLTAGE POWER SUPPLY

Garth E. Driver, Pasco, Wash., assignor to the United States of America as represented by the United States Atomic Energy Commission Application January 20, 1955, Serial No. 483,186

5 Claims. (Cl. 321—2)

This invention relates to high voltage supplies and, more particularly, to an oscillator-type voltage supply circuit utilizing semi-conductor devices which are generally known in the art as transistors.

The principal object of the invention is to provide a high voltage supply circuit utilizing 3-electrode, semi-conducting devices.

It is the further object of this invention to provide a high voltage supply circuit having a comparatively high efficiency thereby resulting in long battery life.

Another object of the invention is to provide a high voltage supply circuit having a small weight and size as desired for portable use.

In the attainment of the foregoing objects, an important feature of the invention resides in the use of a pair of transistors in an alternate-firing oscillator circuit having a coupling transformer and other circuit components which are used for interconnecting the various electrodes of the transistors. An output transformer is connected to one side of the coupling transformer so that whenever the circuit is operating and the transistors are conducting in an alternate manner, oscillations produced in the coupling transformer are impressed across the input of the output transformer so that a voltage is available at the secondary winding of the output transformer. A conventional voltage doubling circuit utilizing high voltage selenium rectifiers and capacitors in conjunction with a voltage regulating tube are employed to control the output of the voltage supply circuit.

For additional objects and advantages, and for a better understanding of this invention, attention is directed to the following description and accompanying drawing, in which.

An extensive amount of literature has been written by various authors in discussing the operation of transistors and it is assumed that the operation of the transistors is well known and therefore no detailed discussion will be had on the operation thereof. For information on the operation and theory of transistors, reference may be had to the book "Electrons and Holes in Semi-Conductors," by W. Shockley, D. Van Nostrand Co., Inc., 1953. Also, the use of transistor elements in various electronic circuits, such as amplifier and oscillator circuits, are described in an U. S. Patent No. 2,524,035, issued to J. Bardeen et al. on October 3, 1950.

Figure 1:
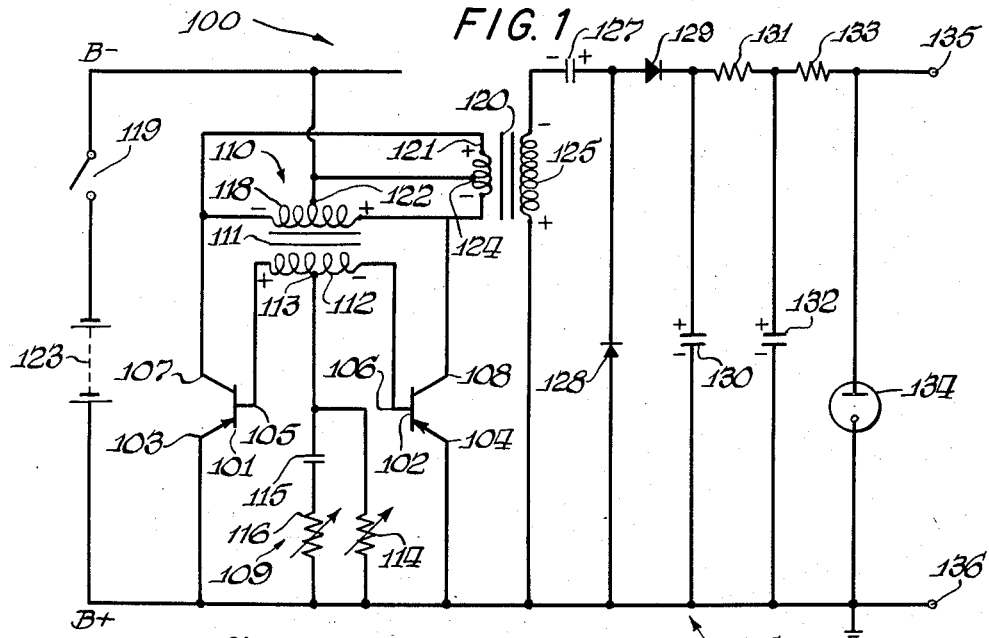
Fig. 1 is a schematic diagram of the invention showing an alternate-firing oscillator high voltage supply.

Referring to Fig. 1, a high voltage supply circuit 100 utilizes a pair of transistors 101 and 102 having emitter electrodes 103 and 104, base electrodes 105 and 106, and collector electrodes 107 and 108, respectively. The high voltage supply circuit 100 may be considered as having two individual circuits, an emitter-base circuit 109 and a collector-base circuit 110. The two circuits are connected together through various electrodes of the two transistors 101 and 102 and coupled inductively by impedance means such as a coupling transformer 111. The base electrode 105 is connected through a winding 112 of the coupling transformer 111 to the base electrode 106 of the transistor 102. The emitter electrode 103 of the transistor 101 is connected directly to the emitter electrode 104 of the transistor 102. The winding 112 has a center tap 113 which is connected through a series combination of a capacitor 115 and a resistor 116 to the junction of the two emitter electrodes 103 and 104. A resistor 114 is connected in parallel with the series combination of the capacitor 115 and the resistor 116. The collector electrode 107 of the transistor 101 is connected through the secondary winding 118 of the coupling transformer 111 to the collector electrode 108 of the transistor 102. A high voltage output transformer 120 has a primary winding 121 connected across the winding 118 of the coupling transformer 111. The winding 118 possesses a center tap 122 which is connected through a switch 119 to a negative terminal of a battery supply 123. The positive terminal of the battery supply 123 is connected to the junction of the emitter electrodes 103 and 104. The primary winding 121 of the transformer 120 has a center tap 124 connected to the center tap 122 of the winding 118. The high voltage output of high voltage transformer 120 available at a secondary winding 125 is connected to a voltage doubling circuit 126. Specifically, the winding 125 is connected across a series connection of a capacitor 127 and a rectifier 128. A rectifier 129 in series with a capacitor 130 is connected across the rectifier 128. A resistor 131 is connected in series with a capacitor 132 across the capacitor 130. Further, a resistor 133 is connected in series with a voltage regulating tube 134 across the capacitor 132. The output of the high voltage supply circuit 100 is available at terminals 135 and 136 connected across the regulator tube 134.

Because of the variation of characteristics existing among transistors of the same type, resistors 114 and 116 are of the adjustable type so that they may be adjusted for each different pair of transistors used. The resistor 116 is used for changing the peak current and the pulse width in the oscillator circuit and the resistor 114 is used for determining the repetition rate of the oscillation of the oscillator circuit. Although any suitable rectifier, such as a diode tube, may be used in the voltage doubling circuit 126, over-all efficiency is attained by utilizing a high voltage selenium rectifier.

The oscillator high voltage supply circuit 100 operates in the following manner: Since a slight dissymmetry will always exist between the transistors used in the circuit and also in the various components comprising the circuit, the closure of the switch 119 will cause a momentary current flow from the positive terminal of the battery supply 123 through the resistor 116, capacitor 115 and through the center tap 113. Assuming for the moment that the dissymmetry between the two transistor characteristics is such that the transistor 101 reaches a highly conductive state, voltages will be impressed on the other transistor, namely transistor 102, so as to decrease the current flow therethrough and put the transistor 102 into low conductive state. As soon as the charge on the capacitor 115 has leaked off partially through the resistance 114, the interplay of the regenerative voltages generated by the coupling transformer 111 will enable the transistor 102 to reach a highly conducting state and at the same time for the transistor 101 to reach a low conducting state. The result is that the transistors 101 and 102 conduct in an alternate manner to produce high voltage pulses in the primary winding 121 of the high voltage transformer 120. The output of the high voltage transformer 120 is taken from the secondary winding 125 and, in a manner well known in the art, the peak voltage is approximately doubled and rectified and then made available at the terminals 135 and 136. The voltage regulating tube 134 is used to control the output voltage to the desired magnitude. The balanced output of the transformer 120 presents a signal suitable for voltage doubling, which output helps in two ways: First, the possibility of a transformer breakdown is decreased because the voltage on secondary winding 125 is nearly one-half of the output voltage and second, more of the rectified current is available at the output since each selenium rectifier is subjected to only one-half of the voltage available at the terminals 135 and 136 during most of the cycle, thereby producing a back current which is small and tolerable.

Figure 2:
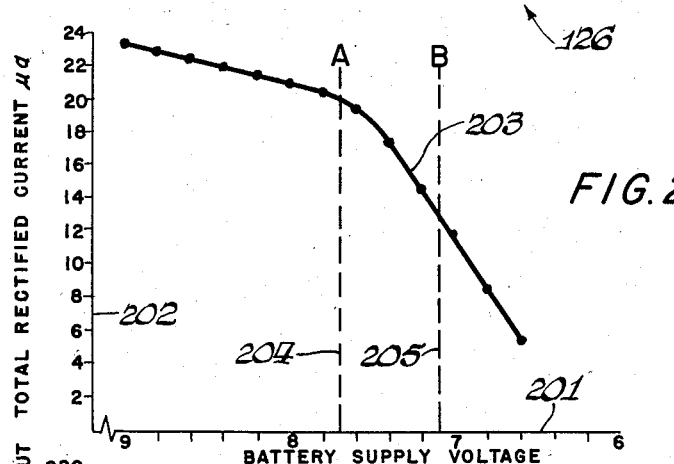
Fig. 2 is a graph showing the variation of the load and regulator current in the circuit with decreasing battery voltage.

Because the high voltage supply circuit 100 was designed as a stable voltage supply for a portable radiation instrument, tests were made to determine the change of high voltage output under load with a varying battery voltage; and, also, the change of load and regulator current with varying battery voltage. The total output current (including voltage regulator tube current) is plotted against the battery voltage in Fig. 2. The abscissa 201 represents the battery supply voltage and the ordinate 202 represents the total rectified current in microamperes. The curve 203 represents the variation of the total output rectified current with changes in the battery supply voltage. In a particular construction of the circuit, the values of the various components in said construction to be given hereinafter, the line 204 corresponds to a 1.1 volt per cell end point with seven mercury cells in series, the value at which the average cell is nearly discharged. In actual life tests with the high voltage supply, this 7.7 volt point occurred after 440 hours of continuous operation. The dotted line 205, drawn at the battery voltage producing the minimum high voltage output current capable of operating a voltage regulator and related equipment, such as a photomultiplier, was reached within a few hours of the end of useful battery life. Thus the long term efficiency of the circuit is enhanced by its ability to utilize nearly all the energy of the battery.

Figure 3:
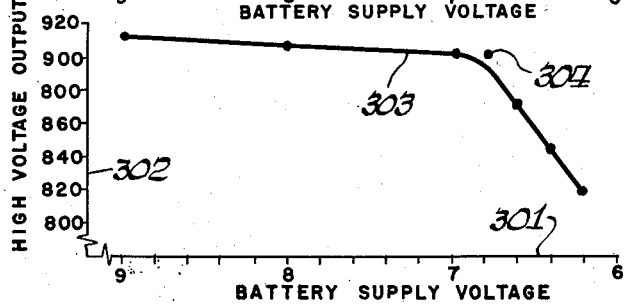
Fig. 3 is a graph showing the variation of the high voltage output of the circuit with decreasing battery voltage.

The high voltage output of the circuit is plotted against the battery voltage in Fig. 3. The abscissa 301 represents the battery supply voltage and the ordinate 302 represents the high voltage output with the curve 303 showing graphically the relation between the two values. The point 304 represents a drop-off, which began at 6.9 volts, caused by the lack of sufficient voltage to fire the regulator tube. From this curve, it is seen that the output voltage regulation from 9 to 7 input volts is 0.55%, the slope being exaggerated by the suppressed ordinate zero.

In the light of the foregoing tests, the alternate firing transistor blocking oscillator appears to be satisfactory as a high voltage supply for Geiger and scintillation counters. A circuit efficiency of 30% gives a long battery life needed for economical survey operation where battery replacement forms a large part of instrument maintenance expense. The voltage supply has the small weight and size required for portable use, one embodiment of the circuit weighing 4.5 ounces without mounting plates and occupying less than 5 cubic inches.

In the particular construction of the invention referred to hereinbefore, the values of the various circuit components were as set out below:

Resistors:
```
114 ------------------------------------ 5.6K
116 ------------------------------------ 1.0K
131 ------------------------------------ 1.0M
133 ------------------------------------ 100.0K
```
Capacitors:
```
115 ------------------------------mfd-- 0.3
127 ------------------------------mfd-- 0.01
130 ------------------------------mfd-- 0.01
132 ------------------------------mfd-- 0.01
```

Transformers:
```
111 ------------------------------------ UTC O-12
120 ------------------------------------ PTC O-3
```
Transistors:
```
101 and 102 --------------------------- CK722
```
Rectifiers:
```
128 and 129 -------- High voltage selenium type
```
Voltage regulator tube:
```
134 ------------------------------------ 5841
```

While there has been shown and described a specific embodiment of this invention, further modifications and improvements thereof are possible by those skilled in the art. It is understood, therefore, that this invention is not limited to the specific form and that it is intended in the appended claims to claim to cover all modifications which do not depart from the spirit and scope of this invention.

What is claimed is:

1. A voltage supply comprising a pair of transistors, each transistor having a base, an emitter and a collector electrode, a source of voltage, a transformer having a pair of center-tapped windings, a resistor-capacitor network, the first winding being connected to the base electrodes and the center-tap of the first winding being connected through the network to the emitter electrodes and the source of voltage, a high voltage transformer having an output and a center-tapped input winding, the collector electrodes being connected to the second winding of the transformer and the input winding of the high voltage transformer, the center-tap of the second winding of the transformer and the center-tap of the input winding of the high voltage transformer connected to said source of voltage to impress a bias on the transistors, whereby said transistors in cooperation with said transformer will conduct alternately to produce voltage variations in the output of the high voltage transformer, and means connected to the output of said high voltage transformer to rectify and increase the magnitude of said varying voltage.

2. An oscillator voltage supply comprising a pair of transistors, each transistor having an emitter electrode, a collector electrode, and a base electrode, a first circuit connecting the emitter electrodes to the base electrodes, a second circuit including an output transformer connecting one collector electrode to the other collector electrode, biasing means connected across the two circuits to initiate conduction in said transistors, said first circuit being regeneratively coupled to the second circuit to impress voltage signals of opposite polarities on said transistors whereby one of said transistors is in a momentary high conductive state and the other transistor is in a momentary low conductive state to generate oscillating voltages in the output transformer, and means connected to the output transformer to rectify and increase the voltage present at said output transformer.

3. A transistor voltage supply comprising a pair of transistors, each having a base, a collector, and an emitter, a coupling transformer having a pair of center-tapped windings, the bases being connected through the first winding to the emitters and the collectors being connected through the second winding to each other to form a push-pull circuit arrangement, a source of voltage, means for connecting the source across the center-taps of the coupling transformer to initiate conduction through the transistors, an output transformer connected across the second winding, said coupling transformer responsive to current flow therethrough to increase conduction in one transistor and to decrease the conduction in the other transistor in alternate manner, said transistors and the coupling transformer cooperating to generate a varying voltage across the output transformer, and means connected across the output transformer to rectify and increase the voltage output.

4. The transistor voltage supply as claimed in claim 3, said connecting means include a network comprising a resistor connected in parallel across a series connection of another resistor and a capacitor to control the magnitude of the current flowing through the transistors, the duration of current flow and the current flow durations.

5. A transistor high voltage supply comprising a pair of transistors each having a base, a collector, and an emitter, a coupling transformer having one center-tapped winding connected between the bases and a second center-tapped winding connected between the collectors, a resistor connecting the center-tap of said first winding to the emitters, a resistor and a condenser in parallel with said first resistor, a source of voltage connected between the center-tap of said second winding and said emitters and an output transformer connected across the second winding, said coupling transformer effective to control the conduction of said transistors in alternate manner whereby oscillating voltages are generated in said output transformer.

References Cited in the file of this patent

UNITED STATES PATENTS 2,325,965     McArthur _____ Aug. 3, 1943

OTHER REFERENCES

Electronics, August 1954, pp. 144, 145.